United States Patent

[11] 3,628,253

[72] Inventor Wallace D. Shepard
 10 N. Williams St., Kennewick, Wash. 99336
[21] Appl. No. 12,405
[22] Filed Feb. 18, 1970
[45] Patented Dec. 21, 1971

[54] EXTENSIBLE CONSTRUCTION MARKER
 3 Claims, 4 Drawing Figs.
[52] U.S. Cl. ..................................... 33/189,
 33/174, 101/368
[51] Int. Cl. ..................................... B25d 5/00
[50] Field of Search ........................... 33/189,
 191, 174 B; 101/368

[56] References Cited
 UNITED STATES PATENTS
 1,029,386  6/1912  Mays ........................... 33/191
 1,543,093  6/1925  Bickl ........................... 33/191
 3,025,609  3/1962  Hendrix ....................... 33/191
 3,137,947  6/1964  Flower ........................ 33/191
 3,403,623  10/1968 Blackwood .................. 33/189

Primary Examiner—William D. Martin, Jr.
Attorney—John W. Kraft

ABSTRACT: The marker includes a pair of grooved slides each having a rack rectilinearly disposed along one of the respective terminal edges thereof slidably engaged with respective tongue portions of the body of the marker. A pair of pinion gears engaging respective racks of the slide members are journaled for rotation in the body. The pinion gears also engage a gear carried by a crank rotatably mounted in the body, the crank and gears being operable to simultaneously move the slide members in opposite directions. Each of the slide members are provided with marking means mounted at the respective outermost opposite terminal ends of each of the slide members.

PATENTED DEC 21 1971
3,628,253
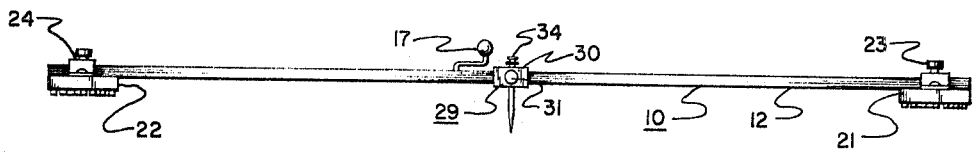
FIG. 1
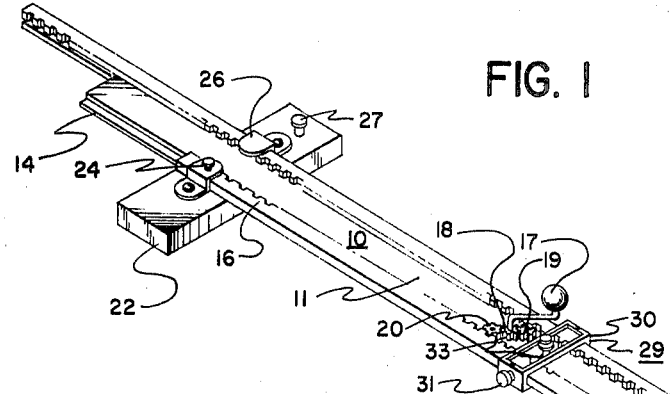
FIG. 2
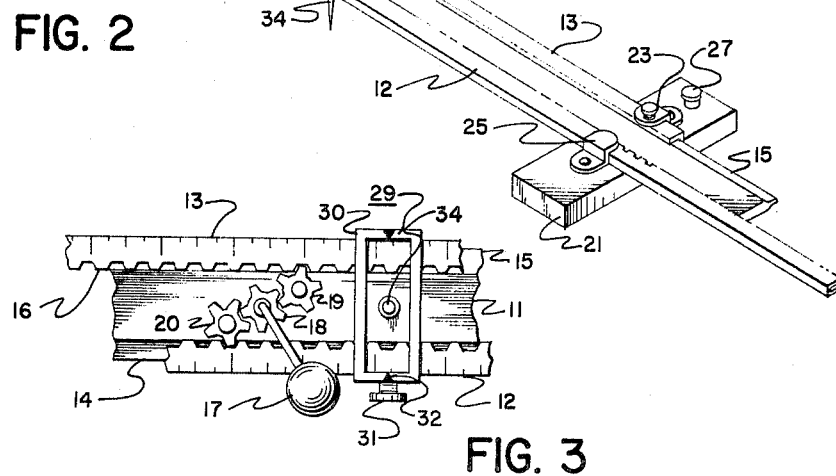
FIG. 3
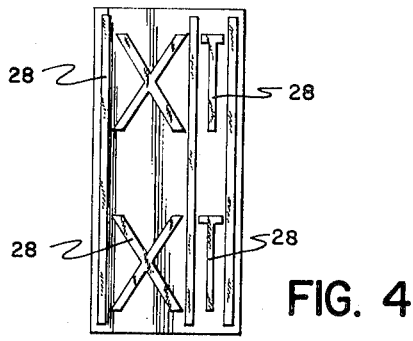
FIG. 4
WALLACE D. SHEPARD  INVENTOR.
BY 

EXTENSIBLE CONSTRUCTION MARKER

FIELD OF INVENTION

The present invention relates to marking apparatus and more particularly to extensible construction marking apparatus operable to mark the location of building elements for portals including doors, windows, and the like for building construction.

DESCRIPTION OF THE PRIOR ART

In order to layout and determine openings for portals such as doors, windows and the like in the construction of buildings it has been customary to measure the distance form a preselected reference point to the centerline of the opening. After this is completed it is necessary to measure from the centerline outwardly one half the distance of the opening plus the thickness of construction elements such as studs and trim. Because the actual dimensions of standard building materials vary in fractional amounts from normal size, it is necessary to very accurately measure minute fractional units to determine the location of building elements. This is very time consuming and critical.

Accordingly it is an object of this invention to provide an extensible construction marker which is simple to operate and which will determine the exact location of building elements for various sizes of openings.

Another object of the present invention is to provide means in an extensible construction market which mark the location of elements coincident with the actual sizes of building materials commonly used.

A further object of this invention is to provide an extensible construction market operable from the centerline of the opening to locate building elements.

These and other objects shall become apparent from the description following.

SUMMARY OF INVENTION

The present invention comprises a body including a pair of tonguelike portions extending rectilinearly along the opposite terminal edges thereof, a pair of grooved slide members engaging each of the tonguelike portions, each of the grooved slide members including a rack ending rectilinearly along one of the terminal edges of each of the respective guide members, a pair of pinion gears journaled for rotation in the body and engaging respective racks of the grooved slide members, drive means for turning said pinion gears simultaneously, and marking means mounted at the respective terminal ends of the grooved slide members.

BRIEF DESCRIPTION OF DRAWINGS

FIG. 1 is a side elevational view of the extensible construction marker of the present invention.

FIG. 2 is a top perspective view of the marker of the invention.

FIG. 3 is a fragmentary view to a larger scale showing the body, grooved slide members including a rack, pinion gears and crank assembly, and the locking means of this invention.

FIG. 4 is a bottom plan view of marking means showing one configuration of transfer means.

A more thorough and comprehensive understanding may be had from the description of the preferred embodiment following when read in connection with the foregoing drawings forming a part of this specification.

DETAILED DESCRIPTION OF THE PREFERRED EMBODIMENT

Referring now to the drawings and more particularly to the side elevational view of the FIG. 1 and the top perspective view of the FIG. 2 which show to advantage the extensible construction marker of the present invention generally identified by the numeral 10. The marker 10 includes a body 11 having a pair of opposing grooved slide members 12 and 13 slidably carried by respective tonguelike portions 14 and 15 on the opposite sides of the body 11 engaging the respective grooved portions of the members 12 and 13. A scale or incremental indicia are provided on each of the guide members 12 and 13 in which the indicia is graduated in from lower to higher numerals reading in opposite directions on each so that when the members are proportionally slidably moved in opposite directions as hereinafter later described the same numerical indicia will appear at a given point on the body 11 on each of the members 12 and 13. Each of the members are provided with a rack 16 extending rectilinearly along one of the terminal edges of each of the members. A crank 17 including a gear 18 is journaled for rotation in the body 11. The crank 17 and gear 18 are centrally disposed in the body 11. Respective pinion gears 19 and 20 are journaled for rotation in the body 11 and engage the gear 18 and respective racks 16 of the respective grooved slide members 12 and 13. The members 12 and 13 are proportionally driven rectilinearly inwardly and outwardly in response to movement of the crank 17 and the gears 18, 19, and 20.

A pair of hollow boxlike marking means 21 and 22 are suitably mounted near one of the terminal ends of the respective grooved slide members 12 and 13. That is to say that the marking means 21 is suitably mounted on the member 12 by a bracket 23 while the marking means 22 is suitably mounted on the marking means 13 by a bracket 24. Respective slide brackets such as shown at 25 and 26 suitably fastened only to respective marking means 21 and 22 may be provided to slide on the respective members 12 and 13 to add stability to the respective marking means.

The construction of the marking means 21 and 22 is identical except indicia on one usually may be the reflection of indicia on the other as hereinafter later described. However, the description of one such means shall suffice for both and thereby avoid descriptive redundancy. The hollow boxlike marking means includes a filler cap 27 threadably carried in the body thereof. The hollow boxlike marking means is operable to provide a reservoir for marking material such as inks, dyes, chalk, powder or the like. The marking means are provided with transfer means 28 mounted in the lowermost wall of the marking means. The transfer means may be wicklike felt material or a screenlike material operable to transfer marking material from the reservoir through the transfer means onto a building element to be marked. The FIG. 4 shows to advantage one of a variety of indicia in which the transfer means may be oriented in the wall of the marking means. The configuration of the indicia shown is a marking by which such building elements as a stud member and a trim member may be aligned to form an opening in a wall for doors, windows or the like in a building being constructed. In this environment it should be understood that the display and arrangement of indicia on one marking means should be the opposite or reflection on the other marking means.

Referring now to the fragmentary view of the body and slide members of this invention to a larger scale of the FIG. 3, a locking assembly 29 disposed at the centermost portion of the body 11 and extends about the members 12 and 13. The locking assembly includes a frame portion 30 having a thumbscrew 31 threadably mounted in one of the terminal sides of the frame portion to engage one of the grooved slide members. When the thumbscrew 31 is tightened against the grooved slide member, the frame portion 30 tends to draw the opposite grooved slide member toward the body 11 and thereby bindingly lock the body 11 and the members 12 and 13 together. The frame portion 30 is provided with indicia 32 on the opposite terminal sides of the frame portion 30 operable to be aligned with respective indicia on the grooved slide members 12 and 13. A hole 33 is centrally disposed in the body 11 and the frame assembly 29 operable to receive an interfibrous fastener such as the nail 34 shown to advantage in FIGS. 1 and 2.

To locate and mark a portal opening in the layout for construction of a building, a measurement is taken from a selected reference point to the center line of the portal. The extensible construction marker of the present invention is oriented to the centerline point by putting a nail 34 through the hole 33 and the nail 34 is driven into the construction element to be marked. The crank 17 is rotated to turn the gears 18, 19, and 20 to cause the grooved slide members 12 and 13 to be proportionally moved rectilinearly inwardly or outwardly by respective racks 16 to predetermined indicia on the slide members 12 and 13 which are coincident with the size of portal openings desired. When the respective indicia are aligned with indicia 32 of the locking assembly 29, manual pressure may be applied to respective marking means 21 and 22 to cause the building element to be marked.

Having thus described in detail a preferred apparatus which embodies the concepts and principles of the invention and which accomplished the various objects, purposes and aims thereof, it is to be appreciated and will be apparent to those skilled in the art, that many physical changes could be made in the apparatus without altering the inventive concepts and principles embodied therein. Hence, it is intended that the scope of the invention be limited only to the extend indicated in the appended claims.

I claim:

1. In an extensible construction marker the combination of a pair of grooved slide members having a rack rectilinearly disposed on one of the terminal edges of each of the members, a body portion having a pair of tonguelike portions rectilinearly disposed on each of the opposing terminal edges thereof, said grooved slide members being slidably engaged with respective tonguelike portions on opposite sides of said body portion, a pair of pinion gears rotatably mounted in said body portion, said pinion gears engaging respective racks of respective grooved slide members, a crank member having a gear engageable with said pinion gears, said crank and said gear being journaled for rotation in said body portion, a locking frame assembly having a framework extending over said body portion and engaging said grooved slide members, a thumbscrew threadably mounted in one of the terminal sides of said framework operable to engage one of said groove slide members, said framework being suitably fastened to said body portion, said locking frame assembly being disposed in the centermost portion of said body portion, a hole in said body portion disposed in the centermost portion of said locking frame assembly and operable to receive a nail therethrough, a pair of marking means carried by at one of the terminal ends of respective grooved slide members, said marking means comprising a hollow boxlike body portion including threadably mounted filler cap, said boxlike body portion operable to provide a reservoir for marking material, marking material transfer means mounted in the lowermost wall of said boxlike body portion, said transfer means being operable to transfer marking material in said reservoir onto building elements to provide indicia with which to align other building elements in the construction of buildings.

2. The apparatus of claim 1 in which said transfer means is configured to include indicia coincident with the terminal sides of standard sizes of building elements.

3. The article of claim 2 in which said transfer means includes a combination of said indicia coincident with a plurality of building elements operable to provide marks by which alignment of a multiplicity of said elements may be had to form the stud and trim portions of a portal opening.

* * * * *